United States Patent
Keller-Spitzer et al.

(10) Patent No.: US 9,441,324 B2
(45) Date of Patent: Sep. 13, 2016

(54) TEXTILE FIBERS HAVING PHOTOCATALYTIC PROPERTIES FOR DEGRADING CHEMICAL OR BIOLOGICAL AGENTS, METHOD FOR PREPARING SAME AND USE THEREOF IN PHOTOCATALYSIS

(76) Inventors: Valèrie Keller-Spitzer, Oberschaeffolsheim (FR); Nicolas Keller, Holtzheim (FR); Mathieu Grandcolas, Sarrebourg (FR); Alain Louvet, Bretigny sur Orge (FR)

( * ) Notice: Subject to any disclaimer, the term of this patent is extended or adjusted under 35 U.S.C. 154(b) by 636 days.

(21) Appl. No.: 12/736,044
(22) PCT Filed: Mar. 6, 2009
(86) PCT No.: PCT/FR2009/000238
§ 371 (c)(1), (2), (4) Date: Apr. 22, 2011
(87) PCT Pub. No.: WO2009/118479
PCT Pub. Date: Oct. 1, 2009

(65) Prior Publication Data
US 2011/0245576 A1    Oct. 6, 2011

(30) Foreign Application Priority Data
Mar. 6, 2008   (FR) ...................... 08 01232

(51) Int. Cl.
*B01D 53/02*   (2006.01)
*B01D 53/56*   (2006.01)
(Continued)

(52) U.S. Cl.
CPC ............. *D06M 11/46* (2013.01); *A62D 5/00* (2013.01); *B82Y 30/00* (2013.01); *D06M 11/44* (2013.01);
(Continued)

(58) Field of Classification Search
None
See application file for complete search history.

(56) References Cited

U.S. PATENT DOCUMENTS 6,407,156 B1 *   6/2002   Hagihara et al. ............. 524/494
2004/0265587 A1 *   12/2004   Koyanagi et al. ............. 428/398
(Continued)

FOREIGN PATENT DOCUMENTS

JP        2008002007 A     1/2008
WO    WO-2006/048531 A1   5/2006

OTHER PUBLICATIONS

Morel et al(A Feasibility Study of the Destruction of Chemical Weapons by Photocatalytic Oxidation, Science and Global Security, 1997, vol. 6, pp. 205-237).*
Hur et al(Enhanced Photocatalytic Activity in composite of TiO2 nanotubes and CdS nanoparticles, Chem Commun, 2006, 5024-5026).*
Database WPI Week 200618 Thomson Scientific, London, GB; AN 2006-167517 XP002502580 & JP 2006 035498 A (Dokuritsu Gyosei Hojin Busshitsu Zairyo) Feb. 9, 2006.
(Continued)

*Primary Examiner* — Melvin C Mayes
*Assistant Examiner* — Michael Forrest
(74) *Attorney, Agent, or Firm* — John P. White; Cooper & Dunham LLP

(57) ABSTRACT

The invention relates to textile fibers at least partially covered with a nanometric-sized semiconducting material having photocatalytic properties for degrading chemical compounds, in particular chemical or biological agents, wherein said semiconducting material is in the form of nanostructure or nanocomposites with a one-dimensional morphology. The textile fibers can be used for application in the military, medical, and civilian domains, etc. The curves 60 and 62 respectively show the photocatalytic degradation of organic compounds at the surface of textile fibers covered with nanostructures or nanocomposites having a one-dimensional morphology according to the invention, and nanoparticles having a granular morphology according to the prior art. The nanostructures are nanocomposites of the invention 60 are more efficient.

14 Claims, 7 Drawing Sheets

(51) Int. Cl.
| | |
|---|---|
| B01J 8/00 | (2006.01) |
| C07C 11/24 | (2006.01) |
| D06M 11/46 | (2006.01) |
| A62D 5/00 | (2006.01) |
| B82Y 30/00 | (2011.01) |
| D06M 11/44 | (2006.01) |
| D06M 11/48 | (2006.01) |
| D06M 11/53 | (2006.01) |
| D06M 11/77 | (2006.01) |

(52) U.S. Cl.
CPC ............ *D06M 11/48* (2013.01); *D06M 11/53* (2013.01); *D06M 11/77* (2013.01); *Y10T 428/292* (2015.01); *Y10T 428/2927* (2015.01); *Y10T 428/2933* (2015.01); *Y10T 428/2958* (2015.01); *Y10T 442/2516* (2015.04); *Y10T 442/3976* (2015.04); *Y10T 442/696* (2015.04)

(56) References Cited

U.S. PATENT DOCUMENTS

| | | | |
|---|---|---|---|
| 2006/0024228 A1* | 2/2006 | Liang et al. | 423/610 |
| 2006/0205304 A1* | 9/2006 | Marzolin et al. | 442/180 |
| 2008/0005852 A1* | 1/2008 | Hu et al. | 8/115.51 |
| 2008/0021212 A1* | 1/2008 | Whiteford et al. | 540/472 |
| 2008/0045770 A1* | 2/2008 | Sigmund et al. | 588/299 |

OTHER PUBLICATIONS

Database WPI Week 200543 Thomson Scientific, London, GB; AN 2005-418524 XP002502694 & CN 1 586 713 A (Univ Qinghua) Mar. 2, 2005.

Jitianu, A., Cacciaguerra, T., Benoit, R., Delpeux, S., Béguin, F., & Bonnamy, S. (2004). Synthesis and characterization of carbon nanotubes—$TiO_2$ nanocomposites. *Carbon*, 42(5-6), 1147-1151.

Sun, J., Iwasa, M., Gao, L., & Zhang, Q. (2004). Single-walled carbon nanotubes coated with titania nanoparticles. *Letters to the Editor I Carbon*, 42(4), 895-899.

Li, H., Zhu, B., Feng, Y., Wang, S., Zhang, S., & Huang, W. (2007). Synthesis, characterization of $TiO_2$ nanotubes-supported MS ($TiO_2NTs@MS$, M=Cd, Zn) and their photocatalytic activity. *Journal of Solid State Chemistry*, 180(7), 2136-2142.

Idakiev, V., Yuan, Z.-Y., Tabakova, T., & Su, B.-L. (2005). Titanium oxide nanotubes as supports of nano-sized gold catalysts for low temperature water-gas shift reaction. *Applied Catalysis A: General*, 281, 149-155.

International Preliminary Report on Patentability, including English Translation of the Written Opinion of the International Searching Authority, mailed Oct. 5, 2010 in connection with PCT International Application No. PCT/FR2009/000238.

English Translation of the International Search Report, mailed Feb. 3, 2010 in connection with PCT International Application No. PCT/FR2009/000238.

\* cited by examiner

TEXTILE FIBERS HAVING PHOTOCATALYTIC PROPERTIES FOR DEGRADING CHEMICAL OR BIOLOGICAL AGENTS, METHOD FOR PREPARING SAME AND USE THEREOF IN PHOTOCATALYSIS

This application is a §371 national stage of PCT International Application No. PCT/FR2009/000238, filed Mar. 6, 2009, designating the United States, and claims priority of French Patent Application No. 0801232, filed Mar. 6, 2008, the contents of each of which are hereby incorporated by reference into this application.

The present invention relates to textile fibers and a textile material with photocatalytic properties for the degradation of chemical or biological agents, to a process for preparing these fibers, and to the use of these fibers and of this textile material for photocatalysis.

Nuclear, radiological, biological and chemical (NRBC) protection of military personnel or civilians is usually ensured by protective textiles or materials that are impermeable, semi-permeable or permeable to air such as clothing, gloves, shoes, tents, tarpaulins, etc., these textile articles being used for protecting individuals or any products against NRBC warfare agents that are toxic or pathogenic to man or the environment.

Impermeable or semi-permeable textiles or materials provide a barrier against agents, while air-permeable textiles or materials have a filter in the form of a filter medium based on active charcoal, for example, which traps gaseous chemical compounds. These protective textiles or materials, having a storage, trapping or barrier effect, are intended to prevent NRBC agents from coming into contact with the skin or the natural environment.

This type of protective textile or material is currently used in military or civilian applications, for manufacturing personal clothing for protecting against chemical agents in gaseous, vapor or liquid form, such as organophosphorus compounds (VX, sarin, tabun, soman, etc.) or vesicants (yperite, lewisite, etc.). The usual protective materials are formed from a textile and optionally an additional filter material intended to trap chemical agents.

However, these textiles have many drawbacks due to the fact that they do not make it possible to destroy chemical and/or biological agents. An individual using clothing of this type is protected against toxic agents as long as he is wearing this clothing. However, when he removes the clothing, he risks coming into contact with the toxic agents remaining on the surface of the clothing or adsorbed by the adsorbent layer of the clothing, and thus being contaminated by contact or inhalation or after resuspension. Furthermore, when the adsorbent material is saturated with the toxic agent, this material has a tendency to leach part of this agent, which increases the risk of secondary contamination of the individual or the people around him. There is also a major risk of contamination of the people who handle this clothing, for example to decontaminate it or treat it. The decontamination of clothes contaminated with biological or chemical agents is complex and expensive and does not always make it possible to remove all the toxic agents, and as such this type of clothing is generally used only once.

Protective textiles with a destructive or decontaminating effect that can degrade organic compounds via a photocatalytic reaction when they are exposed to natural or artificial illumination are moreover known, for civilian use. The fibers of these textiles are covered with a semiconductive material with photocatalytic properties for degrading organic compounds. The photocatalytic material is, according to the usual technique, in the form of nanoparticles of granular morphology which makes it possible to expose a given area of semiconductive material to the light radiation, their specific surface area being moderate or average. In a known manner, when a semiconductive material receives a photon of energy higher than or equal to the forbidden band or "gap" of this material, an electron-hole pair is created in the semiconductive material: respectively, an electron in the conductive band and a hole in the valency band. These charge bearers have a limited lifetime and may either recombine according to various mechanisms, or react with the compounds to be removed present on contact with the semiconductive material deposited at the surface of the textile. Redox reactions then take place, which allow the oxidation of the targeted compounds, and which lead to the degradation of the toxic products or to less toxic or less harmful photodegradation residues (such as sulfates, phosphates, carbon dioxide, etc.). It then suffices to clean the textile by washing so as to remove the photodegradation residues from the textile.

Textiles with a destructive or decontaminating effect thus have the advantage, over textiles with a storage, trapping or barrier effect, of enabling the destruction of organic compounds without the need for an additional reagent and without entailing consumption of the semiconductive material deposited on the textile. Textiles with a destructive effect are also washable and thus reusable.

However, the lifetime of the charge bearers generated by illumination of the nanoparticles of semiconductive material deposited on the textile may be relatively short, which then limits the efficacy of the photocatalysis. Specifically, the shorter the lifetime of the charge bearers (i.e. the faster the charge bearers recombine), the smaller will be the number of redox reactions generated by these charge bearers and the less efficient will be the photocatalytic degradation of the organic compounds. Textiles with a destructive effect currently make it possible to degrade by photocatalysis organic food compounds such as coffee, wine or grease stains and soiling. Moreover, the duration of exposure of a textile of this type to a light radiation in order to be able to degrade all or virtually all of the organic food compounds present at the surface of the textile may be relatively long.

The aim of the invention is especially to provide a simple, effective and economical solution to the prior art problems.

One subject of the invention is especially textile fibers and a textile with photocatalytic properties for degrading resistant and toxic organic compounds such as chemical or biological agents (neurotoxic chemical agents, vesicants, spores, bacteria, viruses, fungi, etc.).

To this end, the invention proposes textile fibers at least partially covered with a semiconductive material with photocatalytic properties for degrading organic compounds, in particular chemical or biological agents, characterized in that the semiconductive material is in the form of nanostructures of one-dimensional morphology of said semiconductive material, and/or of nanoparticles of said semiconductive material that are attached to nanostructures of one-dimensional morphology of a support material.

According to the invention, the textile fibers are covered with nanostructures of one-dimensional morphology, such as nanotubes and/or nanofibers, which are made of a semiconductive material or of a support material, the nanostructures of one-dimensional morphology made of support material possibly bearing nanoparticles made of semiconductive material or alternatively nanoparticles made of non-semiconductive material.

In the present patent application, the term "semiconductive material" means any material whose electronic structure is formed from a valency band and a conductive band whose respective energy difference is known as the forbidden band or "gap". When a semiconductive material receives a photon of energy higher than or equal to the forbidden band of this material, an electron-hole pair is created in the material. In the context of the present invention, these charge bearers are used to generate redox reactions with organic compounds at the surface of the semiconductive material, for the purpose of the photocatalytic degradation of these compounds.

In the present patent application, the term "support material" means a semiconductive material of the abovementioned type or a non-semiconductive material, whose function is especially to bear nanoparticles of semiconductive material or nanoparticles of non-semiconductive material. The support material has one-dimensional morphology.

In the present patent application, the term "nanostructures of one-dimensional morphology" is understood as meaning nanotubes, nanofibers or the like, which may be made of semiconductive or non-semiconductive material and which have an elongated shape, as opposed to nanoparticles (of granular morphology), as will be described in greater detail hereinbelow. The association or combination of a nanostructure of this type with nanoparticles of a semiconductive material or of a non-semiconductive material is denoted by the term "nanocomposite".

In general, the textile fibers according to the invention may be used for the photocatalytic degradation of organic compounds of any type. They are particularly suitable, but not exclusively, for the degradation of non-toxic organic compounds in civilian applications, these organic compounds being based on C, H, O, etc. They may be soiling or any other type of compounds according to the civilian applications envisioned for the fibers: technical fabric, furnishing fabric, medical fabric, upholstery for motor vehicles or public transport. The fibers or textiles according to the invention may be of the self-cleansing type and may have biocidal properties.

According to the invention, the textile fibers may be covered with:
  nanotubes and/or nanofibers of non-semiconductive material, for example carbon, these nanotubes or nanofibers being covered and/or filled at least partially with nanoparticles of a semiconductive material;
  nanotubes and/or nanofibers of semiconductive material (for example of titanium dioxide or titanate);
  nanotubes and/or nanofibers of semiconductive material, these nanotubes or nanofibers being covered and/or filled at least partially with nanoparticles of a semiconductive material; and/or
  nanotubes and/or nanofibers of semiconductive material, these nanotubes or nanofibers being covered and/or filled at least partially with nanoparticles of a non-semiconductive material (for example metallic). The nanoparticles of semiconductive material may be made of $TiO_2$, $WO_3$, $CdS$, $ZnO$ or $SiC$.

In other words, the nanostructures of one-dimensional morphology according to the invention comprise at least nanotubes or nanofibers and optionally nanoparticles borne by these nanotubes or nanofibers, at least one of the two from among the nanotubes or nanofibers and the nanoparticles being made of semiconductive material.

The use of nanotubes and/or nanofibers as semiconductive material or material forming a support has many advantages described below.

Nanotubes and nanofibers have "one-dimensional" morphology, as opposed to nanoparticles of granular morphology, i.e. nanotubes and nanofibers have one dimension in a direction X, the longitudinal direction, which is very much greater (at least 10 times) than their dimensions in the other two dimensions Y and Z, whereas the dimensions X, Y, Z of nanoparticles are substantially equal to each other.

In other words, nanotubes and nanofibers have a length that is very much greater than their diameter, whereas nanoparticles are defined by a mean diameter or a mean size. The nanotubes and nanofibers according to the invention are characterized especially by two dimensions (for example the length and the diameter), at least one of these dimensions being of nanometric size.

By way of example, nanotubes or nanofibers of semiconductive material and/or of support material have a diameter of between 5 and 150 nanometers approximately, for example between 15 and 20 nanometers approximately, and a length of between 0.1 µm and 5 mm approximately, for example between 0.5 µm and 2 mm approximately.

These nanostructures of one-dimensional morphology are moreover very difficult to degrade, and the textile fibers according to the invention thus have a relatively long lifetime and may be simply washed, for example with water, to be able to remove the photodegradation residues and to be able to reuse these textiles fibers one or more times.

Another advantage of the fibers and textiles of the invention lies in the fact, observed by the inventors, that the efficacy of destruction of the organic compounds by irradiation is great and independent of the photocatalysis conditions: it has been observed, for example, that the performance qualities are identical or virtually identical irrespective of the degree of moisture, for example between 15% and 80% and especially between 20% and 50% of the level of relative humidity.

The nanotubes and nanofibers of a semiconductive or non-semiconductive material according to the invention have specific surface areas that are at least equal to and generally greater than those of nanoparticles of granular morphology in this same material. The nanotubes are formed, for example, by rolling up on themselves sheets of a semiconductive or support material, with relatively large specific surface areas. The use of these nanotubes and nanofibers for the photocatalytic degradation of organic compounds makes it possible to optimize the photocatalysis reaction by increasing the specific surface areas of the material that are exposed to light radiation, and thus by increasing the surfaces for adsorption of the organic compounds. Furthermore, the recombination of the photogenerated charges is limited as a result of their spatial delocalization along the one-dimensional structure.

In a manner known to those skilled in the art, the photocatalytic degradation of organic compounds by means of a semiconductive material deposited on a textile takes place as follows.

The textile covered with the semiconductive material is intended to be exposed to natural or artificial light radiation so as to ensure the photocatalytic degradation of the organic compounds present at the surface of this textile and in contact with the semiconductive material.

Advantageously, the semiconductive material (such as $TiO_2$) is in the form of nanostructures of one-dimensional morphology so as to be activatable simultaneously by ultraviolet light and also by visible light (this is the case, for example, for nanomaterials based on titanate nanotubes), in contrast with certain semiconductive materials in the form of nanoparticles of the prior art, which are activatable only by ultraviolet light. The photocatalytic degradation is performed under natural or artificial illumination, for example by exposure to visible light, ultraviolet radiation and/or sunlight.

The photocatalysis is a heterogeneous catalysis based on an electronic redox process that takes place at the surface of an illuminated semiconductive material forming a catalyst. The semiconductor has an electron structure with a forbidden band or "gap". When it is subjected to photon radiation of energy at least equal to that of the forbidden band, an electron can pass from the valency band to a vacant orbital of the conductive band. There is then creation of a hole in the valency band, and release of an electron in the conductive band. The lifetime of the electron-hole pairs is very limited. In order for the photocatalysis to be effective, recombination must be avoided, this being made possible by the transfer and trapping of the photogenerated free charges. The created charges migrate to the surface of the catalyst and react with adsorbed substances capable of accepting or donating electrons. It is these oxidation or reduction reactions that are advantageous for destroying harmful and toxic compounds and thus for depolluting and/or decontaminating the textile. The electrons may, for example, react with adsorbed oxygen and the holes may oxidize certain adsorbed species capable of donating electrons, for instance steam or organic compounds. In turn, the generated species are highly reactive and may oxidize compounds adsorbed onto the surface of the semiconductor, to the point of mineralizing them.

The use of the semiconductive material in the form of nanotubes or nanofibers, or in the form of nanoparticles borne by nanotubes or nanofibers of a semiconductive or support material has a marked advantage for the photocatalytic degradation of organic compounds, when compared with the use of nanoparticles alone of semiconductive material, for the following reasons. Nanostructures of one-dimensional morphology, which are characterized by a long length relative to their diameter, make it possible firstly to increase the specific surface area of the material and the properties of adsorption of the organic compounds to be degraded at the surface of this material, and secondly to improve the spatial separation of the charges of this material, due to a large delocalization of these charges along the nanostructures. This increased delocalization results in a longer lifetime of the electron-hole pairs, and is reflected by an increase in the photocatalytic reactions of these charges with the substances absorbed onto the surface of the material, and finally by a marked improvement in the photocatalysis performance.

The overall rate of degradation of the organic compounds especially depends on the amount of semiconductive material present at the surface of the textile comprising these textile fibers. The semiconductive material is present on the surface of the textile to a proportion of from 0.01 to 100 $g/m^2$ approximately, for example from 0.1 to 10 $g/m^2$ approximately. The degradation rate also depends on the intensity of the light radiation.

According to one embodiment of the invention, the fibers are covered with titanium dioxide or titanate nanotubes and/or nanofibers. Titanium dioxide ($TiO_2$) is inert, non-toxic, cheap and sparingly sensitive to photochemical corrosion. Furthermore, it has advantageous redox characteristics: the high redox potential of the valency band promotes electron transfers from the adsorbed substances to the semiconductor (oxidation) and the slightly negative potential of the conductive band allows protons or oxygen to be reduced.

The titanium dioxide or titanate nanotubes or nanofibers may be covered or filled at least partially with nanoparticles of another semiconductive material, such as tungsten trioxide ($WO_3$), cadmium sulfide (CdS), zinc oxide (ZnO) or silicon carbide (SiC), or with nanoparticles of a non-semiconductive material, such as platinum, gold, copper, palladium, silver, etc. The covering of a nanostructure with nanoparticles is understood as being the deposition and fixing of nanoparticles to the outer cylindrical surface of the nanostructure. The filling of a nanotube with particles is understood as being the deposition and fixing of nanoparticles in the longitudinal cavity of the nanotube, and on the inner cylindrical surface of the nanotube. The coupling of a nanostructure according to the invention with nanoparticles of another semiconductive material makes it possible especially to broaden the activation or absorption wavelength range in which the charge bearers are generated. The irradiation wavelength of the textile must be sufficiently energetic to bring about electron transfer from the valency band to the conductive band, and thus depends especially on the width of the forbidden band of the semiconductive material(s). The coupling of a nanostructure according to the invention with nanoparticles of a non-semiconductive material makes it possible to improve the photocatalytic and biocidal properties of the nanocomposites thus formed.

The fixing of the nanoparticles of semiconductive material or of non-semiconductive material onto nanostructures of one-dimensional morphology may be performed by any type of binding or interaction, for example covalent bonding, ionic bonding, hydrogen bonding, electrostatic interactions, etc.

In another embodiment of the invention, the textile fibers are covered with carbon nanotubes and/or nanofibers, these nanotubes or nanofibers being covered or filled at least partially with semi-conductive nanoparticles of $TiO_2$, $WO_3$, CdS, ZnO or SiC.

Carbon is a non-semiconductive support material that may be in the form of nanotubes and/or nanofibers whose one-dimensional morphology promotes charge delocalization, as indicated above, and thus promotes specific electronic interactions. Other support materials may be used in the context of the present invention, such as active charcoal, zeolite, alumina, silica, zirconia, clay, etc. The nanotubes or nanofibers of support material are partially covered or filled with nanoparticles of a semiconductive material intended to generate charge beavers when it is exposed to light radiation.

The invention also relates to a textile of the woven or nonwoven type, comprising fibers as described above.

The present invention also relates to a process for preparing textile fibers or a textile as described above. According to the invention, it consists:

either in synthesizing nanotubes or nanofibers of semiconductive material, nanotubes or nanofibers of semiconductive support material combined with nanoparticles of semiconductive or non-semiconductive material, and/or nanotubes or nanofibers of non-semiconductive support material combined with nanoparticles of semiconductive material, and then in covering the fibers of these nanotubes or nanofibers, or in performing the synthesis in situ of these nanotubes or nanofibers directly on the fibers.

The fixing or anchoring of the nanostructures or nanocomposites onto the textile fibers or the textile may vary as a function of the deposition method. Consequently, there may be bonds of covalent or ionic type, electrostatic interactions or even hydrogen bonds between the photocatalytic nanomaterials and the textile.

The textile fibers according to the invention may be natural or synthetic. They may be, for example, cotton, polyester or polyamide fibers, aramid fibers (Kevlar®), glass fibers, etc., or fibers of any other fibrous textile material intended to be woven or nonwoven (for example Gore-Tex®) on which nanofibers and nanotubes of the abovementioned type may be fixed, attached or associated.

Adsorbents may also be coupled to these fibers so as to couple two types of properties, photocatalytic properties and adsorption properties of the molecules to be degraded. The adsorbent phases with large specific surface areas make it possible firstly to increase the amount of adsorbed molecules to be degraded, and secondly to facilitate the contact between these molecules and the photocatalytic sites of the semiconductive material. These effects are also enhanced if intimate contact exists between the photocatalytic nanostructures and the adsorbent particles. In a first embodiment of the process according to the invention, the nanotubes or nanofibers of semiconductive material, and/or the nanofibers or nanotubes of support material combined with the nanoparticles of semiconductive or non-semiconductive material are synthesized directly on the textile fibers or on the textile. To do this, the fibers may be immersed in a solution in which the nanotubes or nanofibers are synthesized, as will be described in greater detail hereinbelow.

An alternative to this first embodiment consists in depositing a solution containing a precursor with titanium (for example metallic titanium, titanium oxide or alkoxides) onto a suitable substrate, and then in directly growing the nanostructures of one-dimensional morphology on this substrate.

As a variant, the abovementioned nanotubes or nanofibers (of semiconductive material and/or of support material) are synthesized in a first stage, and are then deposited on the textile fibers or the textile via one or more suitable techniques, chosen from:
  the spraying technique, consisting in suspending the nanotubes or nanofibers in a suitable liquid or gaseous vehicle at a given concentration, in spraying a given amount of this suspension onto the fibers, and then in drying the textile, for example by evaporating the vehicle; the spraying and drying steps may be repeated one or more times;
  the "layer-by-layer" deposition technique, consisting in impregnating the fibers with a polycation solution at a given concentration, in rinsing the fibers with a suitable rinsing liquid, in impregnating the fibers with a polyanion solution at a given concentration, in rinsing the fibers with a suitable rinsing liquid, and then in drying the fibers, the polyanion solution containing the nanotubes or nanofibers; conversely, a polyanion solution may be applied in a first stage, followed by the polycation solution containing the nanotubes or nanofibers; the impregnation and rinsing steps may be repeated one or more times so as to cover the textile fibers or the textile with a multilayer film composed of an alternation of positively charged layers and of negatively charged layers;
  the immersion or dipping technique, consisting in impregnating the fibers or the textile with a suitable liquid or gaseous vehicle containing the nanotubes or nanofibers in suspension at a given concentration, and then in drying the fibers or the textile.

The preparation of nanotubes or nanofibers of a semiconductive material, for example of titanium dioxide or titanate, may take place as follows. The synthesis of these nanostructures may be performed by hydrothermal treatment at 100-150° C. of the semiconductive material in the form of powder, for example, or in another form such as a substrate containing titanium and forming a precursor of nanostructures of semiconductive material (for example titanium dioxide ($TiO_2$)), in a basic solution, based on sodium hydroxide (NaOH) or potassium hydroxide (KOH), for example, at a concentration of 5-20M, for example. It is possible, for example, to add 0.1 to 10 g of pulverulent semiconductive material to 5-500 mL of NaOH solution (2-20M) in a Teflon autoclave. The whole is stirred for one hour and then left at 100-150° C. for several hours. This step leads to the production of nanotubes of semiconductive material. The powder obtained (or the deposit obtained by growth on the substrate) may then be filtered off under vacuum and washed, for example with hydrochloric acid until neutral, rinsed with distilled water and then dried. A post-synthesis calcination treatment may be performed at 300-400° C., for example at about 350° C. During the rinsing step, the formation of a one-dimensional structure of semiconductive material is gradually obtained. This structure makes it possible to expose a large external contact surface, the semiconductive material thus synthesized having a relatively large specific surface area of about 150 to 400 $m^2/g$ approximately, or even greater.

The preparation of nanocomposites comprising nanotubes or nanofibers of semiconductive material covered and/or filled with nanoparticles of another semiconductive material may take place as follows. Nanotubes of semiconductive material obtained, for example, via the method described previously may be impregnated with a suitable solution, such as an alcohol/water solution, an acetone, hydrocarbon, chloroform, etc., solution, this solution containing a salt of semiconductive material, for example of tungsten. After stirring, the mixture may be subjected to sonication, followed by evaporation at room temperature with stirring. The powder obtained may then be dried and calcined. Nanocomposites of the abovementioned type (nanotube/nanoparticles) are then obtained.

The preparation of nanocomposites comprising nanotubes or nanofibers of a non-semiconductive support material covered and/or filled with nanoparticles of semiconductive material may take place as follows. Nanotubes or nanofibers of support material (for example of carbon) are commercially available, for example from the company Pyrograf Products, Inc. (Cerdaville, Ohio, USA) or synthesized beforehand. These nanostructures are dispersed by sonication in a suitable solution of one of the abovementioned types (alcohol/water, acetone, hydrocarbon, chloroform, etc.), to which is added a precursor of semiconductive material, for example a salt. Titanium isopropoxide may be used, which forms the synthesis precursor via the sol-gel route. An acid or a base, for example hydrochloric acid, may then be added, leading to a sol, which is stirred and matured with stirring for several hours to produce the gel. Finally, the milky solution thus obtained is dried at room temperature for several hours to the point of calcination.

Deposition of the semiconductive material onto the outer surface and/or onto the inner surface of the nanostructures may be favored as a function of one or more parameters involved in the preparation of the nanocomposites. It is possible, for example, to vary the amount of semiconductive material in the alcohol solution, a small amount promoting the formation of nanocomposites in which the nanoparticles are located on the outer surface of the nanotubes, and a larger amount rather promoting the formation of nanocomposites in which the nanoparticles are located in the inner cavities of the nanotubes. It is also possible to use solvents with different wettabilities inside and outside the nanotubes.

The preparation of textile fibers or of a textile via the spraying technique may take place in the following manner.

The nanofibers, nanotubes or nanocomposites may be suspended in a water/alcohol solution at a given concentration. The solution may then be sprayed a first time onto the fibers so as to impregnate these fibers. The fibers may then be stoved and dried. Solution may again be sprayed a second and a third time onto the fibers, each spraying step possibly being followed by a step of drying the fibers.

The spraying technique may be used to deposit any type of nanotube or nanofiber of semiconductive material, or any type of nanotube or nanofiber of support material bearing nanoparticles of a semiconductive material, on any type of textile or textile fiber.

The preparation of the textile fibers or of a textile according to the invention via the layer-by-layer deposition technique may take place in the following manner. The layer-by-layer technique makes it possible to construct multilayer films of polyelectrolyte by successive adsorptions of negatively and positively charged compounds onto the surface of the fibers or textile. To do this, a polycation, on the one hand, and a polyanion, on the other hand, may be prepared, the polyanion or the polycation containing nanostructures or nanocomposites according to the invention. The pH of the polyanion and of the polycation may be adjusted. The textile fibers may be rinsed and defatted beforehand, and then dried. The fibers are introduced into a solution of polycation, rinsed thoroughly with distilled water, placed in the polyanion solution, and then rinsed thoroughly. These steps may be performed as many times as necessary. The fibers are finally dried. The fibers obtained are then covered with a uniform carpet or film, formed from successive layers of nanostructures or nanocomposites. The production of these successive layers offers better resistance to erosion caused by friction. This deposition technique also provides flexibility and modulation and can especially dissociate the functions and nature of the various layers.

The layer-by-layer technique may be used to deposit any type of nanotube or nanofiber of semiconductive material, or any type of nanotube or nanofiber of support material bearing nanoparticles of a semiconductive material, on any type of textile or textile fiber. This technique also makes it possible to cover larger areas of textile fibers or of textiles than the other techniques.

The layer-by-layer technique is particularly suitable for preparing textile fibers according to the invention since it makes it possible to obtain good anchoring of the nanostructures of one-dimensional morphology to the fibers when compared with other preparation techniques. The solidity of the nanostructures on the fibers is such that these fibers can be washed to remove the residues derived from the photocatalytic degradation of organic compounds, without any risk of detaching the nanostructures of the fibers. Moreover, it has been found that the yield for the photocatalytic degradation of organic compounds is higher with nanostructures of one-dimensional morphology deposited on fibers by the layer-by-layer technique than with identical nanostructures deposited via another technique onto identical fibers.

The preparation of textile fibers or of a textile according to the invention via the dipping or immersion (or coating) technique may take place as follows. The deposition of nanostructures or nanocomposites by "coating" may be obtained by dipping the fibers in a water/alcohol solution containing the nanostructures or nanocomposites in pulverulent form in suspension, at a given concentration. The fibers may then be dried under a stream of air, dried at room temperature, and then dried at higher temperature.

The dipping or immersion technique may be used to deposit any type of nanotube or nanofiber of semiconductive material, or any type of nanotube or nanofiber of support material, bearing or not bearing nanoparticles of a semiconductive material, on any type of textile or textile fiber.

The textile fibers according to the invention may also be prepared via the CVD (chemical vapor deposition) technique, which consists in vaporizing a liquid precursor containing titanium directly onto a substrate or support comprising textile fibers.

The preparation of the textile fibers or of the textile according to the invention via the "padding" technique may take place as follows. The nanostructures or nanocomposites may be applied to the textile by padding, spraying, coating, printing or bath exhaustion, for example, as is well known in the field of textile manufacture. Padding is a technique that makes it possible to add a material to the textile by compression (hot or cold compression). The material (in our case the nanostructures or nanocomposites of one-dimensional morphology) is deposited on the textile by dipping the textile in a tank containing the impregnation solution, and the textile is then compressed between two plates, between two rolls, or under a rubber roll to remove (or express) the surplus. The padding operation comprises the two phases (impregnation and expression).

The fixing of the nanotubes, nanofibers or nanocomposites to textile fibers may be obtained by means of binders or spacers. These binders may be of organic or inorganic nature. Organic binders are organic molecules, of carboxylic acid or alcohol type, containing at least two organic functions capable, after chemical reaction, of forming bonds firstly with the textile and secondly with the surface groups of the semiconductive material (such as $TiO_2$). An intermediate layer between the fibers of the textile and the photocatalytic nanostructures is thus produced.

It is also possible to use an inorganic binder such as silica, which makes it possible to increase the sites of attachment for the deposition of the $TiO_2$-based nanostructures or nanocomposites. Specifically, $TiO_2$ molecules have the property of easily forming strong and durable bonds with silica, due to specific interactions.

The in situ synthesis of nanotubes, nanofibers and/or nanocomposites on the fibers of a textile may take place as follows. It is possible directly to synthesize the nanofibers, nanotubes or nanocomposites on a textile, either by performing all the steps of the synthesis directly on contact with the textile, or by performing, on contact with the textile, one or more of the steps of the synthesis process.

The invention also relates to the use of the textile fibers or of the textile of the abovementioned type for the photocatalytic degradation of toxic organic compounds, in particular of biological or chemical agents in gaseous or liquid form.

According to the invention, the term "chemical or biological agents" means any substance that may be lethal or neutralizing to man (or even to certain animals and/or certain plants). The chemical agents may be classified in three categories: irritants, psychic or physical incapacitators, and lethal agents such as vesicants, suffocants, asphyxiants and neurotoxic agents. Toxic agents based on organophosphates or alkyl sulfides are especially known. The biological agents may be bacteriological weapons or virological weapons, and generally comprise pathological microorganisms intended to weaken or to propagate mortal or incapacitating diseases. The biological agents may be bacteria, viruses, fungi and spores. According to the present patent application, these chemical or biological agents are intended to be destroyed, decomposed or inactivated by photocatalytic degradation on contact with a semiconductive material exposed to light radiation of a given wavelength, this decomposition giving rise to species that are less toxic or nontoxic, which can readily be removed by washing or the like.

In the present patent application, the term "simulating agent" means a mock chemical or biological agent that simulates at least some of the properties and characteristics of a real chemical or biological agent, without either the stimulant or its degradation products having the toxicity of this real agent.

The photocatalytic degradation may be performed between −10 and 150° C. approximately, for example at room temperature. This degradation is performed under natural or artificial illumination, for example under exposure to visible light and/or ultraviolet radiation. The term "ultraviolet radiation" means illumination with a wavelength of less than 400 nm, for example between 350 and 390 nm in the particular case of UV-A radiation. The term "visible light" means illumination with a wavelength of between 400 and 800 nm, and, in the case of sunlight, this means illumination comprising a small portion of UV-A and a large portion of visible light, with a spectral distribution simulating that of the sun or being that of the sun. The textile fibers and the textiles according to the invention are particularly suitable for use in military and civilian applications, for example, but not exclusively, for the manufacture of clothing, gloves, shoes, tents, tarpaulins, shelters, partitions, any fabrics, filters, foams, membranes, etc. These textile articles and accessories may be used, for example, for civilian or research purposes, in hospitals, laboratories, by firemen, and also in domestic applications, but also for military purposes, etc. The textiles, wovens or nonwovens according to the invention may thus be technical or medical textiles, or even furnishing textiles.

The invention will be understood more clearly and other details, characteristics and advantages of the present invention will emerge more clearly on reading the description that is given, by way of non-limiting example and with reference to the attached drawings, in which.

Figure 8A:
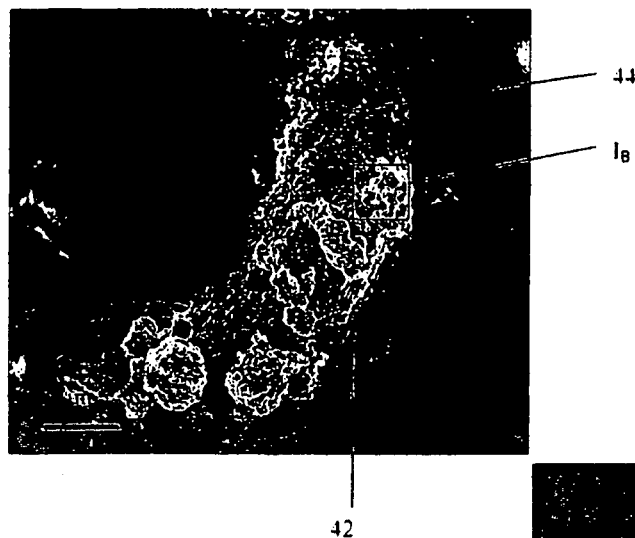
FIGS. 8a, 8b and 8c are scanning electron microscopy (SEM) images of a textile fiber covered via the spraying technique of nanocomposites (nanotube/nanostructures) of the type shown in FIG. 5.
Figure 8B:
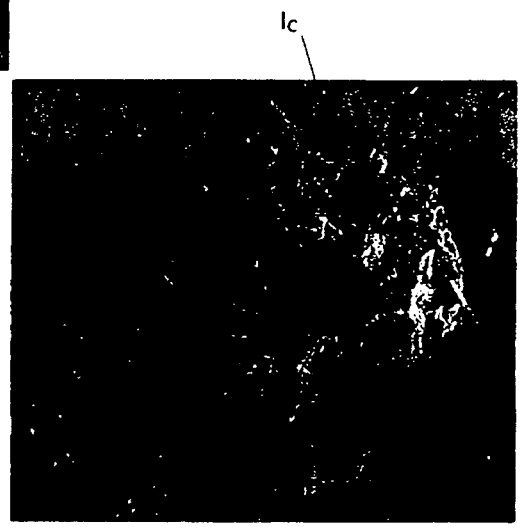
Figure 8C:
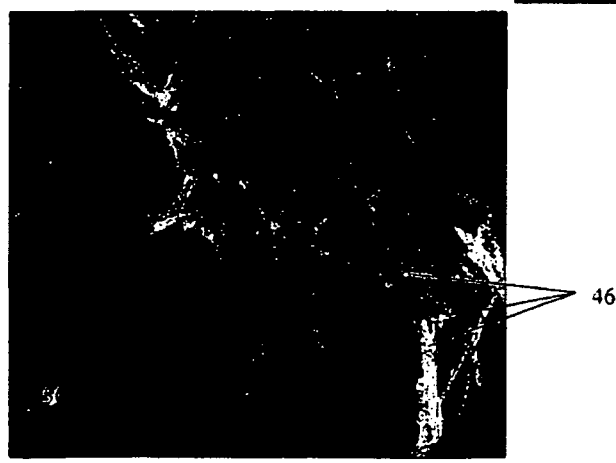
Figure 9A:
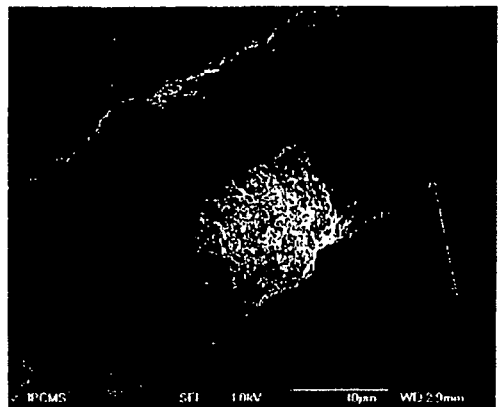
FIGS. 9a, 9b, 9c and 9d are SEM images of a textile fiber covered via the layer-by-layer deposition technique of nanocomposites (nanotube/nanostructures) of the type shown in FIG. 5.
Figure 9B:
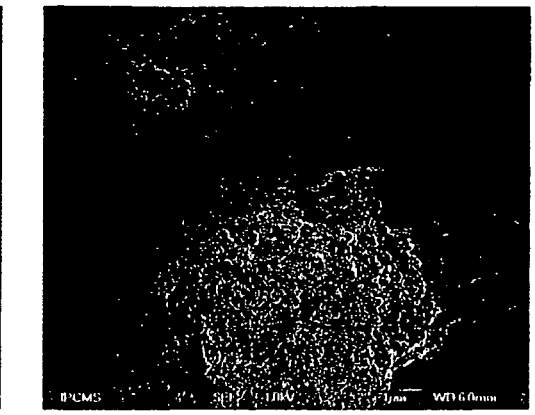
Figure 9C:
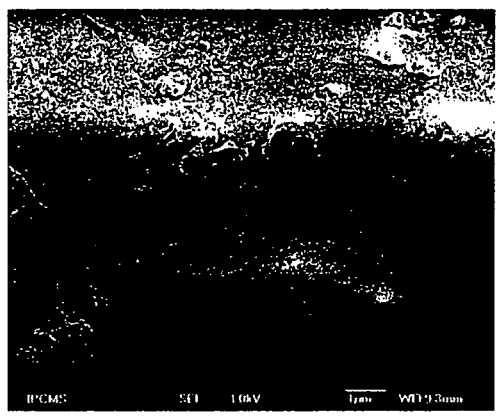
Figure 9D:
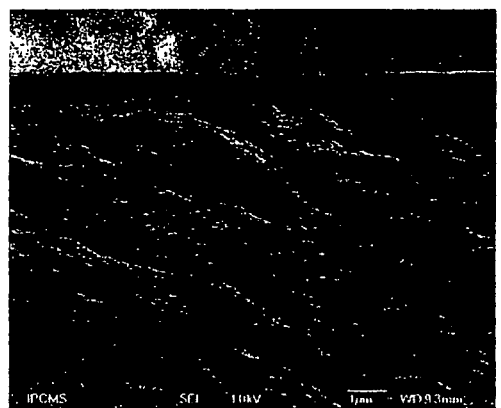
Figure 11:
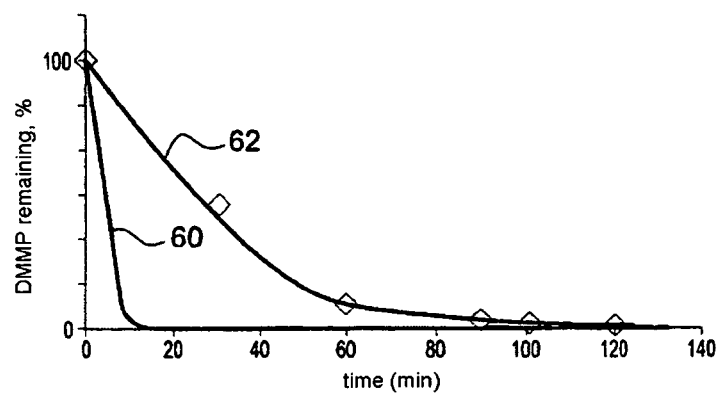
Figure 12:
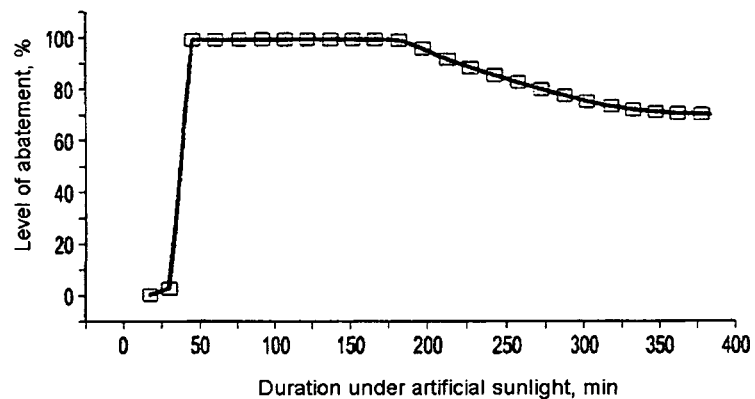
Figure 13:
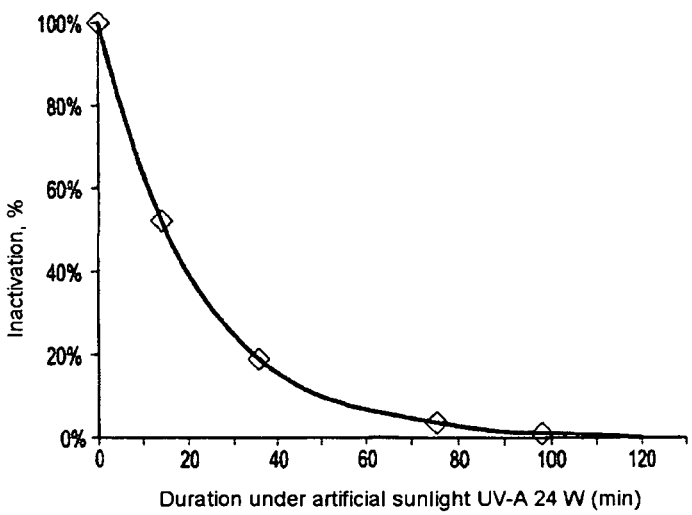
Figure 14:
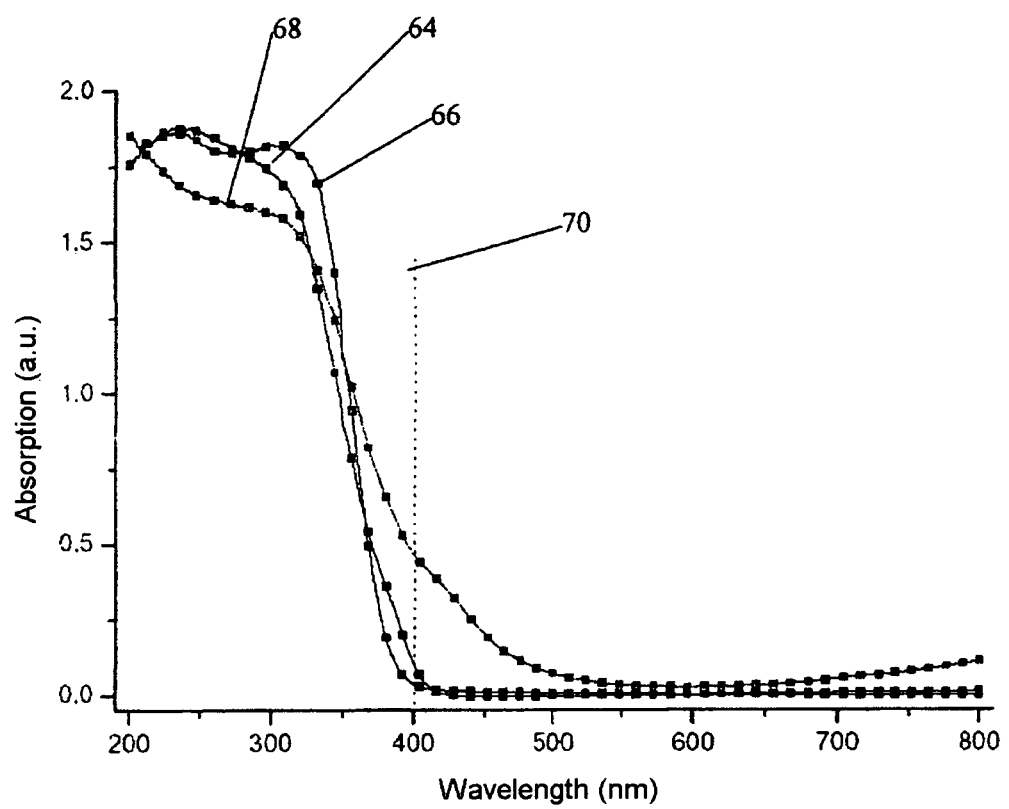

FIG. 11 is a graph showing the change in the remaining level of a simulating agent (DMMP) deposited in the form of droplets onto two textiles, a first textile comprising fibers of the type shown in FIGS. 9a, 9b, 9c and 9d, and a second textile comprising fibers covered with titanium dioxide nanoparticles of granular morphology, as a function of the time of exposure of these textiles to artificial sunlight;

FIG. 12 is a graph showing the change in the level of abatement of a simulating agent (DES) circulating in the gaseous phase at a low flow rate in sweeping contact with a textile comprising fibers of the type shown in FIGS. 8a, 8b and 8c, as a function of the time of exposure of this textile to artificial sunlight;

FIG. 13 is a graph showing the change in the level of inactivation of *Bacillus subtilis* spores deposited on a textile comprising fibers of the type shown in FIGS. 8a, 8b and 8c or 9a, 9b, 9c and 9d, as a function of the time of exposure of this textile to artificial sunlight; and FIG. 14 is a graph showing the change in light absorption of semiconductive materials of different structures as a function of the wavelength of an incident light radiation.

Reference is first made to FIGS. 1 to 4, which show very schematically, respectively, a nanofiber 10 of semiconductive material, for example a nanotube 12 of semiconductive material, for example a nanocomposite formed from a nanofiber 14 of support material covered, for example, with nanoparticles 16 of semiconductive or non-semiconductive material, and a nanocomposite formed from a nanotube 18 of support material, for example covered and filled with nanoparticles 16 of semiconductive or non-semiconductive material for example.

The term "nanotube or nanofiber" means a geometrical structure of nanometric size (nanostructure) of one-dimensional morphology as described above, this nanostructure being able to be made from a semiconductive material or from a support material. The term "nanocomposite" means a nanostructure of the abovementioned type (semiconductive or non-semiconductive) also associated or combined with nanoparticles of a semiconductive or non-semiconductive material. The support material may be a semiconductive material or a non-semiconductive material.

The present invention relates to a textile whose fibers are at least partially covered with nanofibers 10, 14 or nanotubes 12, 18 of this type (or with nanostructures 10, 12 or nanocomposites 14, 16 and 16, of this type), the semiconductive material in the form of nanofibers 10, nanotubes 12 and/or nanoparticles 16 having photocatalytic properties of degradation of organic compounds, as will be described in greater detail hereinbelow. The fibers of the textile may be covered with one or more types of nanofibers, nanotubes and/or nanocomposites.

The nanofibers 10, 14 are solid and have a cross section of substantially circular shape. These cross sections may, however, have a square, rectangular, oval or other shape.

Each nanotube 12, 18 is formed by rolling up on itself a plane or sheet 22 of low thickness, around the longitudinal axis of the nanotube. Each nanotube 12, 18 may also be formed by rolling up on themselves several superposed planes or sheets, around the longitudinal axis of the nanotube.

Each nanotube 12, 18 comprises a longitudinal internal cylindrical cavity 22 inside which may be housed and fixed nanoparticles 16 of semiconductive or non-semiconductive material. The nanofibers 10, 14 or nanotubes 12, 18 have a length of between 0.1 µm and 5 mm approximately, and preferably between 500 nm and 500 µm approximately. The outside diameter of the nanotubes and nanofibers is between 5 and 150 nanometers approximately and preferably between 15 and 20 nanometers approximately.

The nanoparticles 16 of semiconductive material have a mean diameter of between 3 and 200 nm and preferably between 5 and 20 nm approximately. The or each sheet 22 of a nanotube 12, 18 has a thickness of the order of 1 to 5 nm and preferably 2 to 3 nm. The thickness especially depends on the material.

The support material in the form of nanofibers 14 or nanotubes 18 may be a semiconductive material or a non-semiconductive material, these nanofibers or nanotubes being covered and/or filled with a semiconductive or non-semiconductive material in the form of nanoparticles 16 that may be identical to or different than the semiconductive material forming the one-dimensional nanostructures.

The combination of a first semiconductive material in the form of a nanofiber or a nanotube with a second semiconductive material in the form of nanoparticles makes it possible to broaden or shift the absorption wavelength range of light of the nanocomposite (formed by the nanofiber/nanoparticles or nanotube/nanoparticles combination) via which the photocatalysis is activated and takes place.

The combination of a semiconductive material in the form of a nanostructure of one-dimensional morphology with a non-semiconductive material in the form of nanoparticles makes it possible to impart new properties to the nanocomposites thus formed, or to improve certain properties of these nanocomposites. By way of example, the nanostructures may be combined with metallic nanoparticles, in particular such as Au, Ag, Cu, Pd or Pt nanoparticles, to increase, for example, the biocidal properties of the nanocomposites. These metallic nanoparticles may be in ionic or nonionic form.

The combination of a non-semiconductive support material with nanoparticles of semiconductive material makes it possible to combine the properties and advantages of each of these materials. For example, the large specific surface area and the spatial delocalization properties of the charges of carbon nanofibers may be combined with the photocatalytic properties of titanium dioxide nanoparticles in carbon nanofiber/$TiO_2$ nanoparticle nanocomposites.

The semiconductive material in the form of nanotubes, nanofibers or nanoparticles makes it possible, by virtue of its forbidden-band electron structure, to generate charge bearers when it is exposed to light radiation of a given wavelength. These charge bearers are intended to react with the organic compounds at the surface of the textile to degrade them via photocatalytic reaction. However, these reactions are possible, efficiently, only if the lifetime of the charge bearers is sufficiently long, i.e. if the charge bearers do not recombine immediately after having been created.

The one-dimensional morphology of the nanofibers or nanotubes of semiconductive or non-semiconductive material according to the invention allows the charges to be spatially delocalized over the entire length of the nanofibers or nanotubes and thus allows this lifetime to be substantially increased. The nanostructures (nanotubes and nanofibers) and nanocomposites according to the invention are thus particularly suitable for degrading via photocatalysis resistant organic compounds such as neurotoxic chemical weapons based, for example, on organophosphates (VX, sarin, soman, etc.) or vesicants based, for example, on alkyl sulfides (yperite, mustard gas, etc.).

By way of example, the semiconductive material in the form of nanofibers 10, nanotubes 12 or nanoparticles 16 is titanium dioxide ($TiO_2$) or titanate, tungsten trioxide ($WO_3$), zinc oxide (ZnO), cadmium sulfide (CdS), silicon carbide (SiC), or any other semiconductive material (or mixture of semiconductive materials) that is activatable in particular in the ultraviolet and/or visible region.

Figure 1:
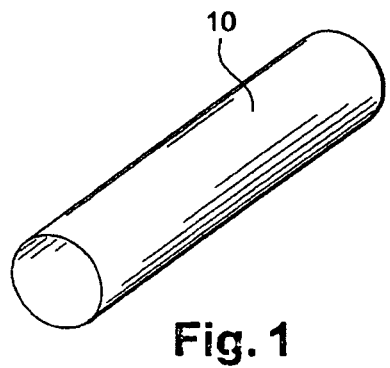
FIG. 1 is a schematic view in perspective of a nanofiber of semiconductive material according to the present invention.
Figure 2:
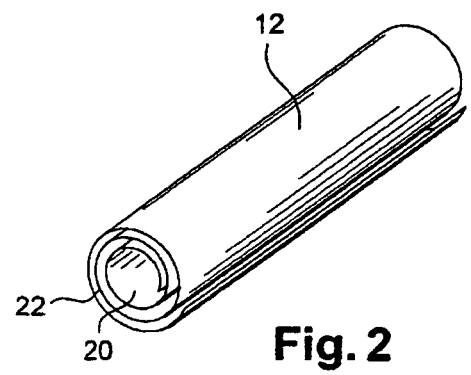
FIG. 2 is a schematic view in perspective of a nanotube of semiconductive material according to the present invention.
Figure 3:
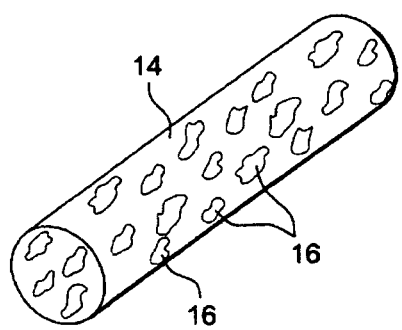
FIG. 3 is a schematic view in perspective of a nanocomposite according to the present invention, comprising a nanofiber of support material covered with nanoparticles of semiconductive or non-semiconductive material.
Figure 4:
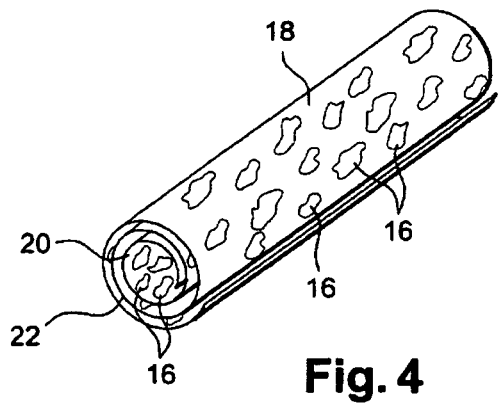
FIG. 4 is a schematic view in perspective of a nanocomposite according to the present invention, comprising a nanotube of support material covered and filled with nanoparticles of semiconductive or non-semiconductive material.
Figure 5:
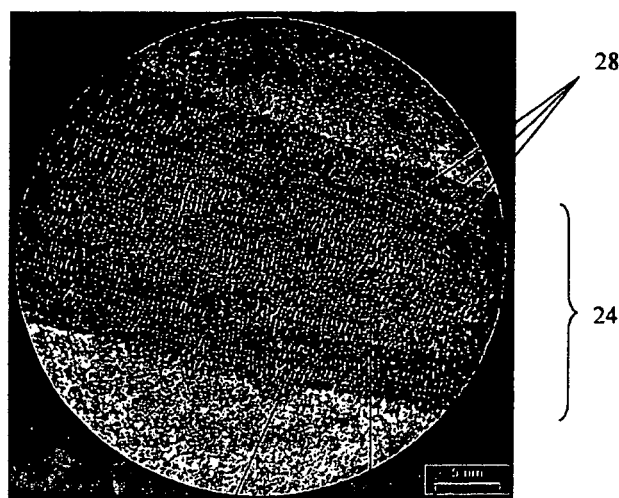
FIG. 5 is a transmission electron microscopy (TEM) image of part of a nanotube of the invention, made of titanium dioxide or titanate covered with tungsten trioxide nanoparticles.

FIG. 5 is a transmission electron microscopy (TEM) image of part of a titanium dioxide or titanate nanotube 24 on the outer cylindrical surface of which are deposited $WO_3$ nanoparticles 26. The nanotube 22 comprises one or more sheets 28 rolled up on themselves, which define an inner cylindrical cavity 30. This nanotube 24 has a length of about 1 µm and a diameter of about 15-20 nm. The specific surface area of the titanium dioxide or titanate in nanotube form is from 300 to 400 $m^2/g$ approximately, and that of the $WO_3$ nanoparticles is 40 $m^2/g$ approximately. These nanoparticles 26 have a mean diameter of 3-5 nm approximately. This nanocomposite ($TiO_2$ nanotube/$WO_3$ nanoparticles) generates charge bearers at an irradiation wavelength ranging up to about 450 nm (and starting, for example, from the UV region), corresponding to the start of the visible region.

Figure 6:
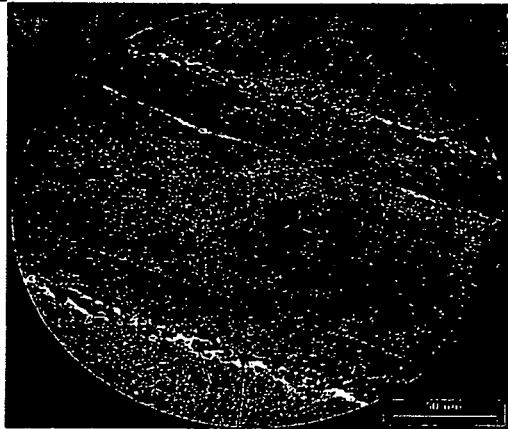
FIG. 6 is a TEM image of part of a nanotube of the invention, made of carbon covered and filled with titanium dioxide nanoparticles.
Figure 7:
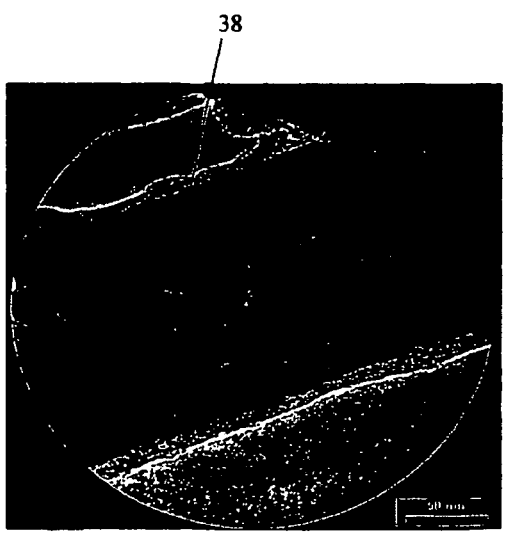
FIG. 7 is a TEM image of part of a nanotube of the invention, made of carbon filled with titanium dioxide nanoparticles.

FIGS. 6 and 7 are TEM images of carbon nanotubes 32, 34 which are covered and filled, respectively, with $TiO_2$ nanoparticles 36 and filled with $TiO_2$ nanoparticles 38. The nanotubes 32, 34 have a length of about 1 µm and a diameter of about 150 nm.

These nanotubes are also formed from one or more sheets and each comprise a longitudinal inner cavity, the inner cavities of the nanotubes 32, 34 comprising $TiO_2$ nanoparticles 38. The nanoparticles 36 present at the surface of the nanotube 32 have a mean diameter of about 5 to 10 nm, and those 36 contained in the nanotubes 32, 34 have a diameter ranging from a few nanometers to about 50 nm. The specific surface area of titanium dioxide or titanate in the form of nanoparticles 36, 38 is about 50 $m^2/g$. The nanocomposites 36 generate charge bearers at an irradiation wavelength ranging up to about 420-450 nm, i.e. in the start of the visible region.

EXAMPLE 1

Preparation of Titanium Dioxide or Titanate Nanotubes

The synthesis of titanium dioxide ($TiO_2$) or titanate nanotubes was performed by hydrothermal treatment at 130° C. of a titanium dioxide ($TiO_2$) powder in a concentrated (10M) basic sodium hydroxide (NaOH) solution. 1 g of pulverulent $TiO_2$ (Degussa P-25) was added to 50 mL of an NaOH solution (10M) in a Teflon autoclave. The mixture was stirred for one hour and then left at 130° C. for 48 hours. This step led to the production of sodium titanate nanosheets. The white powder obtained was then filtered off under vacuum and washed with hydrochloric acid (2M HCl) until neutral, rinsed with distilled water and then dried overnight at 110° C. A post-synthesis calcination treatment was performed at 380° C. During the rinsing step the structure gradually changed from a structure in the form of sodium titanate sheets to a "rolled-up" nanostructure of one-dimensional morphology (of the titanium dioxide or titanate nanotube type) incorporating hydrogen, the protons $H^+$ having gradually replaced the sodium ions $Na^+$ during the rinsing. The semiconductive material thus synthesized had a specific surface area of about 300 to 400 m²/g approximately.

EXAMPLE 2

Preparation of Nanocomposites Comprising Titanium Dioxide or Titanate Nanotubes Bearing and/or Containing Tungsten Trioxide ($WO_3$) Nanoparticles The nanotubes obtained after the preparation process of Example 1 were impregnated with an ethanol/deionized water solution (in a ratio of 1 to 2½) containing a tungsten salt, $(NH_4)_{10}W_{12}O_{41}5H_2O$. After stirring for 1 hour, the mixture was sonicated for 1 hour, followed by evaporation at room temperature for 24 hours with stirring. The powder thus obtained was then dried at 110° C. overnight, and then calcined at 380° C. for 2 hours.

Nanocomposites ($TiO_2$ nanotube/$WO_3$ nanoparticles) as shown in FIG. 5 were thus obtained. These nanocomposites have diameters of about 15-20 nm approximately.

EXAMPLE 3

Preparation of a Textile According to the Invention whose Fibers are Covered with $TiO_2$ Nanotube/$WO_3$ Nanoparticle Nanocomposites via the Spraying Technique The nanocomposites prepared via the process of Example 2 were suspended in a water/ethanol solution (50/50) at a concentration of 10 g/L. The solution was then sprayed a first time onto cotton fibers of a textile so as to impregnate these fibers. The textile was then stoved and dried at 110° C. for 30 minutes. Solution was again sprayed a second and a third time onto the textile, each spraying step being followed by a step of drying the textile in an oven at 110° C., for 30 minutes.

FIGS. 8a, 8b and 8c are scanning electron microscopy (SEM) images of the textile fibers thus prepared, at three different scales, respectively. FIG. 8b is an enlarged image of the detail $I_B$ of FIG. 8a, and FIG. 8c is an enlarged image of the detail $I_C$ of FIG. 8b.

The fibers 42 of the textile that are visible in FIG. 8a have a diameter of about 9-12 µm. These fibers 42 are covered with a carpet 44 of $TiO_2$ nanotube/$WO_3$ nanoparticle nanocomposites 46 that are interlaced.

EXAMPLE 4

Preparation of Nanocomposites Comprising Carbon Nanotubes Bearing and/or Containing Titanium Dioxide or Titanate Nanoparticles The carbon nanotubes used are sold under the name Pyrograf III Carbon Fiber, grade P.R.-24-P5 (0343) by the company Pyrograf Products, Inc. at Cerdaville (Ohio, USA).

A given amount of these pulverulent carbon nanotubes (test 1=0.2 g and test 2=0.4 g) was dispersed in an ethanol solution (20 mL) for 1 hour, followed by addition, with slow stirring, of titanium isopropoxide (7 mL), sol-gel synthesis precursor. The sol obtained thereafter after adding 2M hydrochloric acid (12 mL), with vigorous stirring, was matured with stirring for 72 hours. To finish, the milky solution thus obtained was dried at room temperature for 24 hours, and then at 110° C. for 1 hour, before being calcined at 350° C. for 3 hours.

Nanocomposites such as those shown in FIGS. 6 and 7 were thus obtained.

In the case of test 1, in which the amount of carbon nanotubes dispersed in the ethanol solution was proportionately lower (0.2 g), the nanoparticles 36 were deposited unselectively both inside and outside the carbon nanotubes (nanocomposites of FIG. 6). In the case of test 2, in which the abovementioned amount was larger (0.4 g), selective deposition of the nanoparticles 38 was obtained exclusively inside the carbon nanotubes (nanocomposites of FIG. 7).

EXAMPLE 5

Preparation of a Textile According to the Invention whose Fibers are Covered with Titanate Nanotube/$WO_3$ Nanoparticle Nanocomposites via the Layer-by-Layer Deposition Technique A polycation containing polyethyleneimine $PEI^+$ ($M_w$=800) at 8 g/L, and a polyanion containing a colloidal solution of carbon nanotube/$TiO_2$ nanoparticle nanocomposites prepared via the process of Example 2, was prepared, and adjusted to pH 9 with NaOH (10M).

The textile was rinsed beforehand with distilled water, defatted with acetone and with ethanol, and then dried for 5 minutes at 100° C. This textile was then introduced into the solution of the polycation $PEI^+$ for 20 minutes with orbital stirring, rinsed thoroughly with distilled water, and then placed for 20 minutes in a colloidal solution containing the nanocomposites at 10 g/L, and then rinsed thoroughly. These steps were repeated as many times as necessary. The final material was dried for 5 minutes at 100° C.

FIGS. 9a, 9b, 9c and 9d are SEM images of fibers of a textile prepared via the layer-by-layer technique, at four different scales, respectively. The fibers 48 are made of cotton and have a diameter of 20-25 µm approximately. They are covered with a carpet 50 or a uniform film, formed from successive layers of titanate nanotube/$WO_3$ nanoparticle nanocomposites.

EXAMPLE 6

Preparation of a Textile According to the Invention whose Fibers are Covered with Carbon Nanofiber/Titanium Dioxide Nanoparticle Nanocomposites via the Dipping or Immersion (or Coating) Technique In this example, the macroscopic textile fibers are covered with a network of carbon nanofibers (or nanotubes) serving as one-dimensional nanometric structures, these nanostructures being covered with $TiO_2$ nanoparticles. In this case, the macroscopic fibrous structure is impregnated by dipping with a nickel salt $Ni(NO_3)_2 6H_2O$ (Merck®) in an ethanolic solution (0.9 mL of ethanol containing 0.19 mol/L of nickel per 0.5 g of fibers) to achieve the direct growth of the carbon nanofibers that will serve as nanometric support for the $TiO_2$. Evaporation of the solvent was then performed overnight at room temperature, followed by drying at 110° C. for 10 hours. After reduction at 250° C. under hydrogen for 2 hours to obtain particles of metallic nickel, the synthesis of the carbon nanofibers was obtained by CCVD (chemical catalytic vapor deposition) in an ethanol/hydrogen mixture (mole ratio of 1:5 for a total flow rate of 120 mL/min) at 700° C. for 1 hour, using 0.5 g of the Ni/textile microfibers substrate.

The textile fibers covered with nanocomposites were dried under a stream of air (at 500 mL/min) for 2 minutes, dried at room temperature for 24 hours and then dried at 100° C. for 30 minutes.

Figure 10A:
FIGS. 10a and 10b are SEM images of textile fibers covered via the immersion or "coating" technique of nanofibers of the invention, made of carbon covered with titanium dioxide nanoparticles, FIG. 10b being an enlarged view showing the network of carbon nanofibers bearing $TiO_2$ nanoparticles.
Figure 10B:

FIGS. 10a and 10b are SEM images of fibers of a textile prepared via the abovementioned technique, at two different scales, respectively. The textile fibers have a diameter of 9-10 µm approximately and are uniformLy covered with the nanocomposites 54.

EXAMPLE 9

Use of Textiles According to the Invention for the Destruction of a Chemical Agent in the Form of Droplets in Static Contact with the Textile The fibers of a first textile were covered with a coating of nanocomposites of one-dimensional morphology prepared in Example 2 ($TiO_2$ nanotube/$WO_3$ nanoparticles). The fibers of a second textile were covered with a coating of nanoparticles of granular morphology of semiconductive material.

Chemical warfare agents (VX, HD) and simulating agents (DMMP: dimethyl methyl phosphonate, and DES: diethyl sulfide) were deposited in the form of droplets onto 4 $cm^2$ samples of the first and the second textile, at a rate of 10 g/$m^2$ (NATO standards). These samples were then exposed to artificial sunlight with an electrical power of 24 W, the lamp having been placed in a horizontal position 7 cm above the samples.

All the tests were performed at room temperature at a relative humidity ranging from about 20% to about 50% without influencing the performance qualities.

Nanocomposites ($TiO_2$ nanotube/$WO_3$ nanoparticles) prepared in Example 2 were deposited via the process of Example 5 (layer-by-layer deposition method) onto the first textile, the fibers of which are of the 50% polyamide/50% cotton type. The fibers of the second textile are identical to those of the first textile and are covered with titanium dioxide nanoparticles (P25 Degussa®) deposited via the spraying process of Example 3.

FIG. 11 is a graph illustrating the kinetics of degradation of DMMP over time under artificial sunlight. This graph more specifically shows the change in the remaining level of DMMP on the surface of each textile as a function of the time of exposure of these textiles to the light radiation. This graph reveals total removal of the chemical agent at the surface of the first textile after 8 minutes of exposure (curve 60), as opposed to 100 minutes for the second textile (curve 2). Virtually identical results were obtained with a first textile prepared via the process of Example 3 (spraying method). This figure thus clearly shows the great efficacy of the semiconductive materials of one-dimensional morphology compared with those of granular morphology, for the photocatalytic degradation of organic compounds such as chemical agents.

EXAMPLE 10

Use of a Textile According to the Invention for the Destruction of a Chemical Agent in Gaseous Form in Point Contact Under Sweeping Flow with the Textile The degradation of chemical warfare agents (VX, HD) and of simulating agents (DMMP and DES) in the gaseous phase was formed by passing a stream of air at 50 $cm^3$/min through a saturator containing the liquid chemical agent. The gas stream contaminated with DES (simulating yperite) at 350 ppm was placed in sweeping flow contact with the textile whose fibers were covered beforehand with a deposit of nanostructures or nanocomposites, this fabric having been rolled up on inner wall of a cylindrical reactor. A lamp with an electrical power of 24 W, simulating sunlight, was slid inside the cylindrical tube, thus allowing uniform illumination of the rolled-up fabric on the reactor.

All the tests were performed at room temperature at a relative humidity ranging from 20% to 50% with titanium dioxide or titanate nanotubes deposited on 50% polyamide/50% cotton textile fibers, either via the layer-by-layer method or by spraying, under artificial sunlight.

FIG. 12 is a graph illustrating the kinetics of degradation of DES, and more specifically shows the change in the level of abatement of DES as a function of the time of exposure of the textile to the light radiation. The graph shows total removal of the contaminant over 150 minutes, followed by stabilization at a degree of abatement of 70%.

EXAMPLE 11

Use of a Textile According to the Invention for the Destruction of Biological Agents The biocidal properties (bactericides, virucides, fungicides, sporicides, etc.) of titanium dioxide or titanate nanotubes deposited on textile fibers (cotton) were demonstrated. An example inactivation of spores, *Bacillus subtilis* (simulating anthrax), is reported in FIG. 13. This example was performed on 4 $cm^2$ textile samples coated with a deposit of nanotubes of the abovementioned type. A 1 mL sample of an aliquot containing the bacilli at a rate of $10^9$ spores/mL was deposited by micropipette onto the textile bearing the nanofiber coating, exposed to artificial UV-A illumination (24 W). The UV-A lamp was placed horizontally 7 cm above the sample of fabric. The number of spores still alive was determined, as a function of the duration of exposure to the UV-A radiation, by culturing on plates and counting the colonies formed. After 100 minutes of exposure to the UV-A radiation, an abatement of greater than 99.999% was obtained (FIG. 13).

EXAMPLE 12 in situ Synthesis of Nanotubes or Nanofibers of Semiconductive Material or of Nanocomposites Comprising Nanofibers or Nanotubes of Support Material Bearing Nanoparticles of Semiconductive Material, on a Textile It is possible directly to synthesize the nanofibers, nanotubes or nanocomposites on a textile, either by performing all of the synthesis steps directly on contact with the textile (see Examples 1, 2 and 4 above), or by performing on contact with the textile one or more of the steps of the synthesis process.

In the particular case of Example 1, the textile may be immersed in the starting solution for the preparation of the titanium dioxide or titanate nanotubes, or may be placed in contact with the white powder only during the step of washing with hydrochloric acid and of rinsing, such that the structuring of the semiconductive material in the form of nanotubes takes place directly on the textile.

EXAMPLE 13

Washing and Cleaning of a Textile According to the Invention After Decontamination and/or Depollution by Photocatalysis, for the Purpose of Reusing this Textile After decontamination, the textile may be covered with a solid deposit of sulfates or phosphates (derived from the final oxidation of the toxic agents containing sulfur or phosphorus). These deposits may be removed by washing with water.

EXAMPLE 14

As illustrated by FIG. 14, the light absorption of semi-conductive materials in the form of various structures was measured as a function of the wavelength of an incident light radiation. Three semiconductive materials were tested, and the results of these tests are shown by curves 64, 66 and 68. Curves 64 and 66 show the change in light absorption of $TiO_2$ nanoparticles, i.e. of $TiO_2$ in granular form. Curve 68 shows the change in light absorption of titanate nanotubes covered with $WO_3$ (for example those obtained in Example 3).

The line 70 in dashed marks shows the frontier between the ultraviolet region, which is less than 400 nm, and the visible region, which is greater than 400 nm.

It may be clearly noted that the $TiO_2$ nanoparticles absorb only the ultraviolet light and absorb little or no light in the visible region. In contrast, the titanate nanotubes covered with $WO_3$ according to the invention absorb not only in the ultraviolet region, but also in the visible region.

The invention claimed is:

1. A process for preparing textile fibers at least partially covered with a semiconductive material with photocatalytic properties for degrading organic compounds, wherein the semiconductive material is in the form of nanostructures (10, 12) of one-dimensional morphology of said semiconductive material, and/or of nanoparticles (16) of said semiconductive material that are attached to nanostructures (14, 18) of one-dimensional morphology of a support material chosen from a semiconductive material and a non-semiconductive material, wherein:
the process consists of synthesizing nanotubes (12) or nanofibers (10) of semiconductive material, and combining said nanotubes or nanofibers with nanoparticles (16) of semiconductive or non-semiconductive material to form a first nanocomposite, or synthesizing nanotubes (18) or nanofibers (14) of non-semiconductive support material, and combining said nanotubes or nanofibers with nanoparticles (16) of semiconductive material to form a second nanocomposite, and covering the textile fibers with said first or second nanocomposite via layer-by-layer technique.

2. The process of claim 1, wherein said layer-by-layer technique consists of impregnating the textile fibers with a polycation solution at a given concentration, rinsing the textile fibers with a rinsing liquid, impregnating the textile fibers with a polyanion solution containing the first nanocomposite or the second nanocomposite at a given concentration, rinsing the textile fibers with a rinsing liquid, and then drying the fibers.

3. The process of claim 2, wherein the impregnating and rinsing steps are repeated one or more times so as to cover the textile fibers with a multilayer film composed of an alternation of positively charged layers and of negatively charged layers.

4. A method for the photocatalytic degradation of organic compounds, which comprises contacting the compound with the textile fibers of claim 1.

5. The method of claim 4, wherein the contacting is performed at a temperature between about −10° C. and about 100° C.

6. The method of claim 4, wherein the contacting is performed under natural or artificial illumination.

7. The method of claim 4, wherein the compound is a neurotoxic chemical agent or vesicant.

8. The method of claim 4, wherein the biological agent is bacterium, a virus, a fungus or a spore.

9. The method according to claim 4, wherein said organic compounds are biological or chemical agents.

10. The method according to claim 1, wherein, said organic compounds are biological or chemical agents.

11. A process for preparing textile fibers at least partially covered with a semiconductive material with photocatalytic properties for degrading organic compounds, wherein the semiconductive material is in the form of nanostructures (10, 12) of one-dimensional morphology of a first semiconductive material, and of nanoparticles (16) of a second semiconductive material that are attached to nanostructures (14, 18) of one-dimensional morphology wherein:
the process consists of synthesizing nanotubes or nanofibers of a first semiconductive material, combining said nanotubes or nanofibers with nanoparticles of a second semiconductive material to form a nanocomposite, and covering said textile fibers with said nanocomposite via layer-by-layer technique.

12. The method according to claim 11, wherein said organic compounds are biological or chemical agents.

13. A process for preparing textile fibers at least partially covered with a semiconductive material which is in the form of nanostructure (10, 12) of one-dimensional morphology of said semiconductive material consisting of:
(i) synthesizing nanotubes (12) or nanofibers (10) of semiconductive support material, and combining said nanotubes or nanofibers with nanoparticles (16) of non-semiconductive material to form a first nanocomposite, or
(ii) synthesizing nanotubes (18) or nanofibers (14) of non-semiconductive support material, and combining said nanotubes or nanofibers with nanoparticles (16) of semiconductive material to form a second nanocomposite,
(iii) covering the textile fibers with said first or second nanocomposite by
(a) impregnating the textile fibers with a polycation solution at a given concentration,
(b) rinsing the textile fibers with a rinsing liquid,
(c) impregnating the textile fibers with a polyanion at a given concentration,
(d) rinsing the textile fibers with a rinsing liquid, and
(e) drying the fibers,
wherein the impregnating and rinsing steps are repeated one or more times so as to cover the textile fibers with a multilayer film composed of an alteration of positively charged layers and of negatively charged layers, or
(v) covering the textile fibers with said first or second nanocomposite by
(a) impregnating the textile fibers with a polyanion solution at a given concentration, (b) rinsing the textile fibers with a rinsing liquid,
(c) impregnating the textile fibers with a polycation solution at a given concentration,
(d) rinsing the textile fibers with a rinsing liquid, and
(e) drying the textile fibers, wherein the impregnating and rinsing steps are repeated one or more times so as to cover the textile fibers with a multilayer film composed of an alteration of positively charged layers and of negatively charged layers.

14. The process of claim 1, wherein said layer-by-layer technique consists of impregnating the textile fibers with a polycation solution at a given concentration, rinsing the textile fibers with a rinsing liquid, impregnating the textile fibers with a polyanion solution containing the first nanocomposite or the second nanocomposite at a given concentration, rinsing the textile fibers with a rinsing liquid, and then drying the textile fibers.

\* \* \* \* \*